H. A. BOWERS.
CALCULATING MACHINE.
APPLICATION FILED JUNE 22, 1912. RENEWED DEC. 3, 1919.

1,347,245. Patented July 20, 1920.
11 SHEETS—SHEET 1.

WITNESSES:
INVENTOR
H. A. Bowers
BY
Attorney

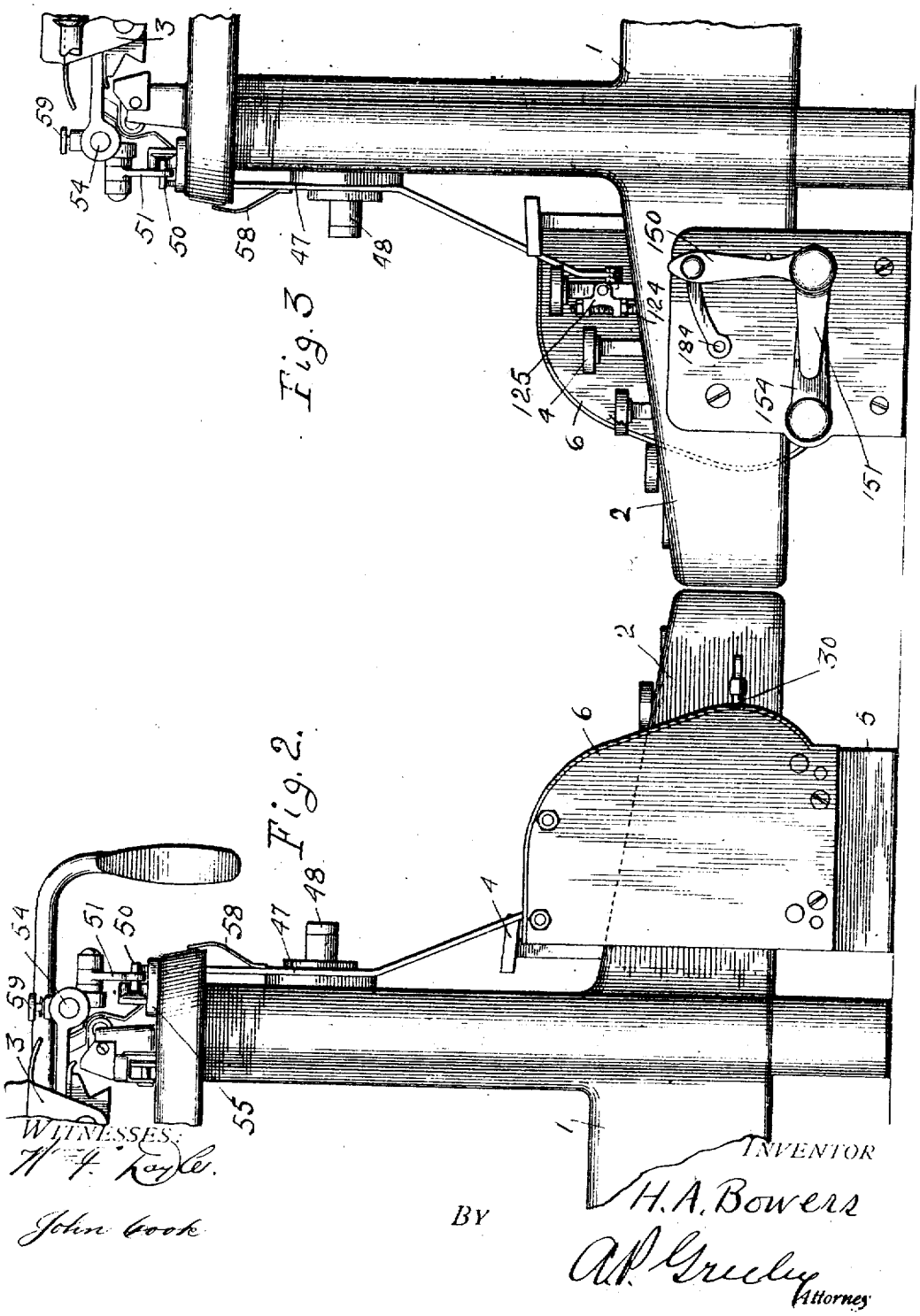

H. A. BOWERS.
CALCULATING MACHINE.
APPLICATION FILED JUNE 22, 1912. RENEWED DEC. 3, 1919.

1,347,245.

Patented July 20, 1920.
11 SHEETS—SHEET 3.

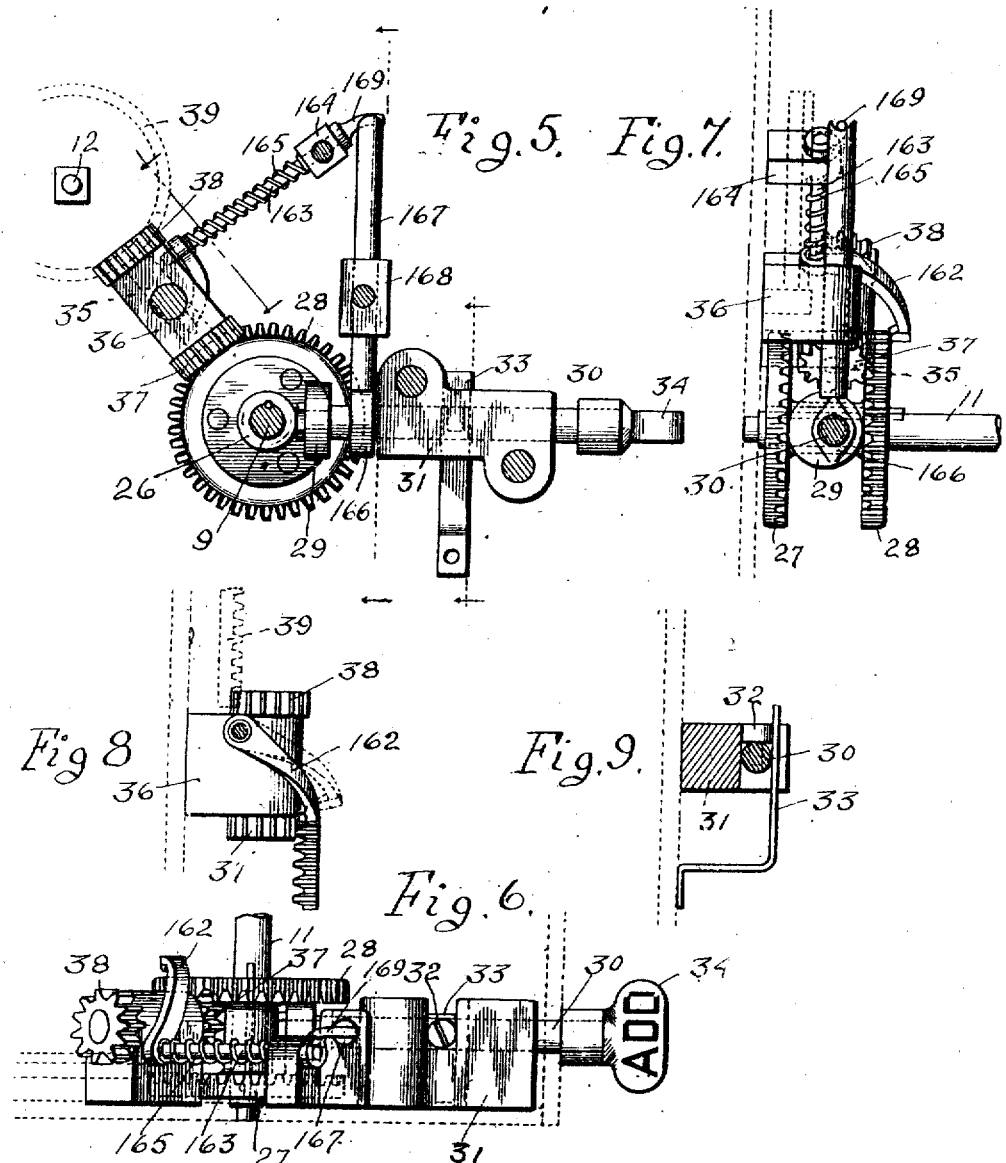

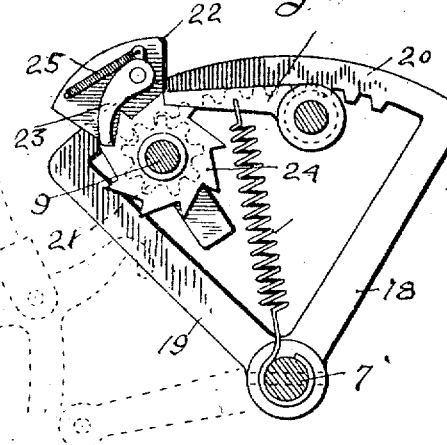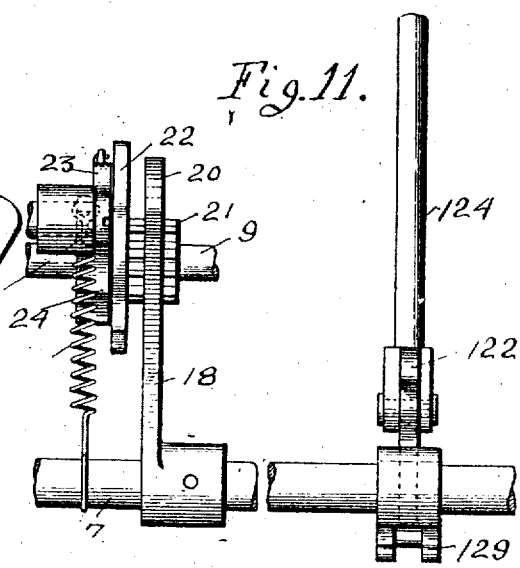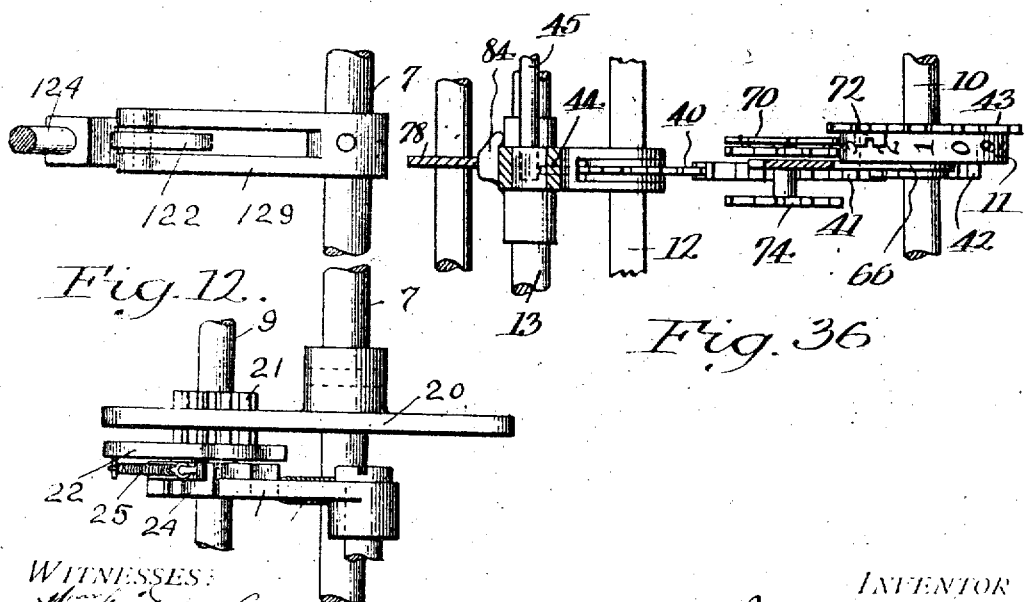

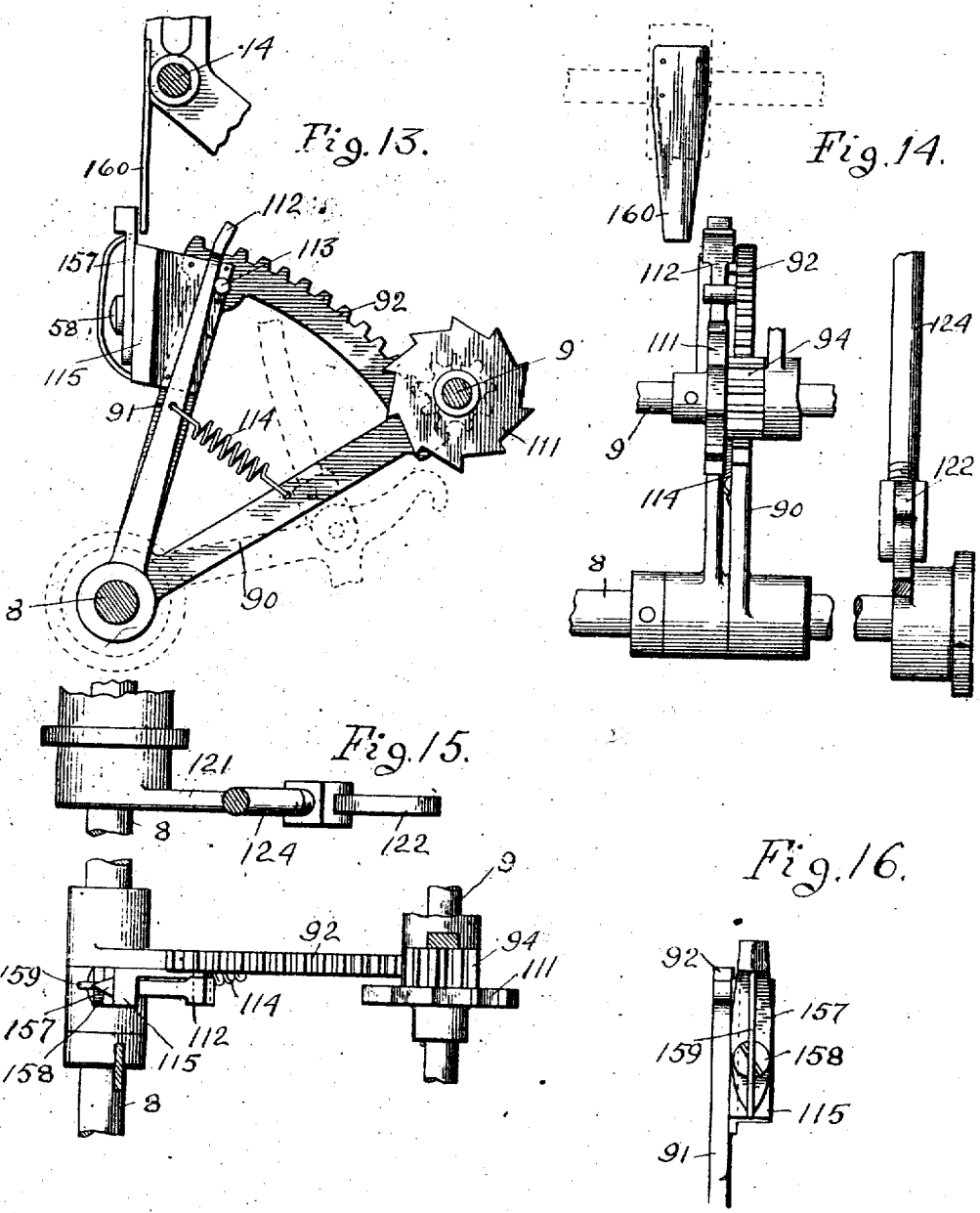

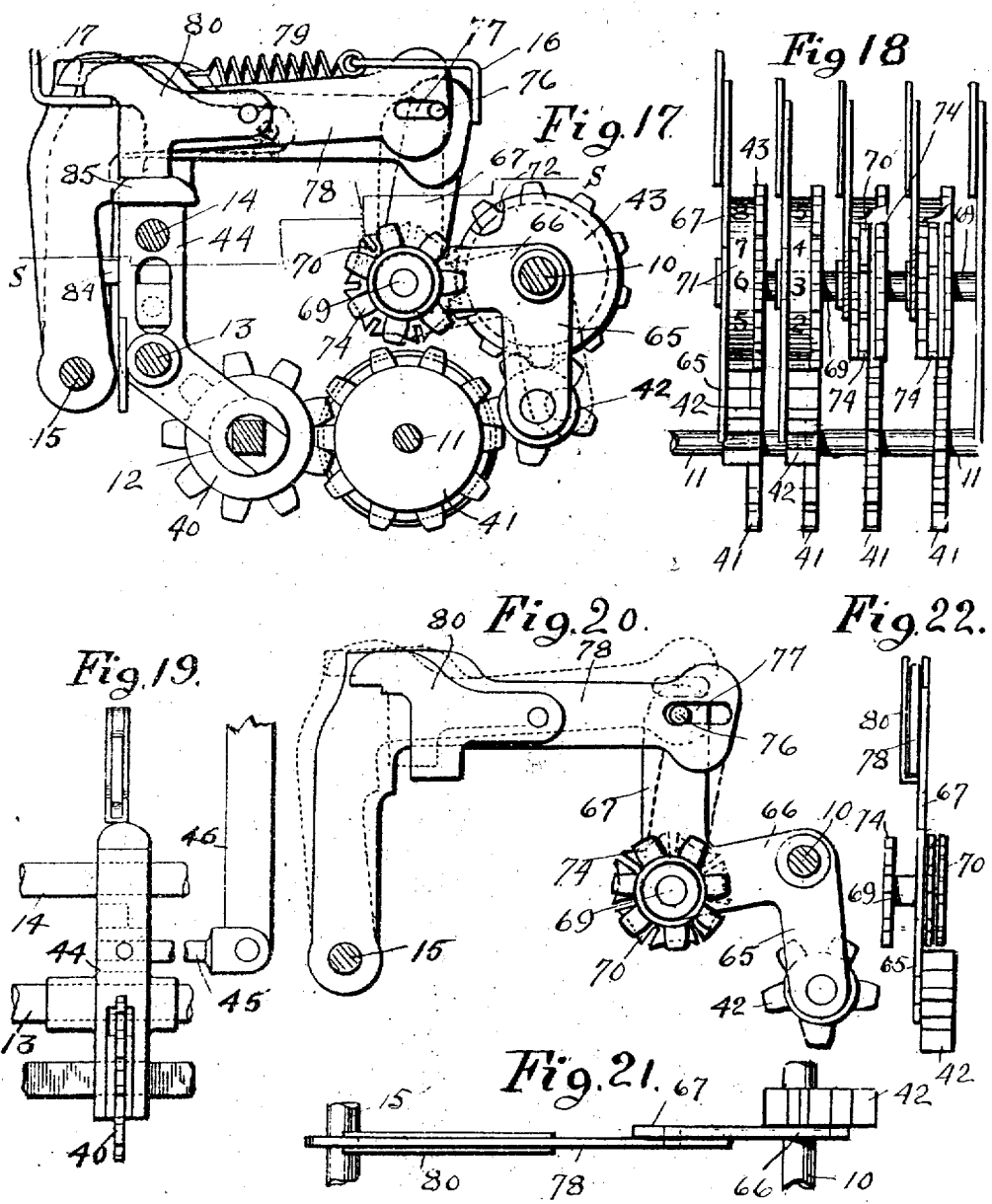

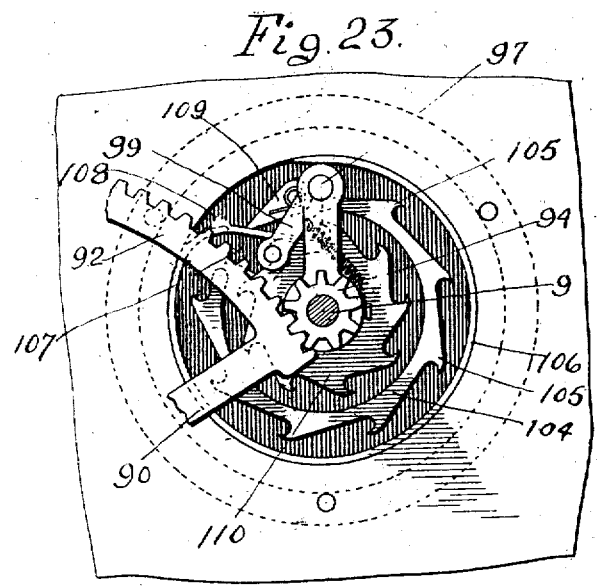
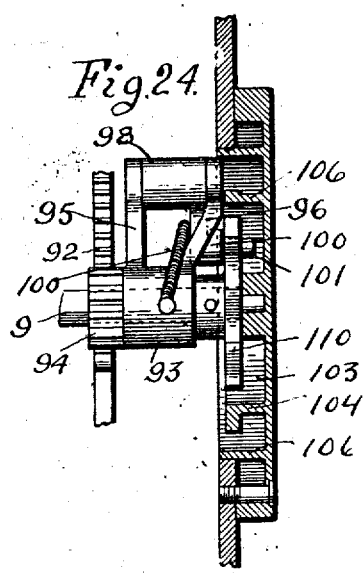
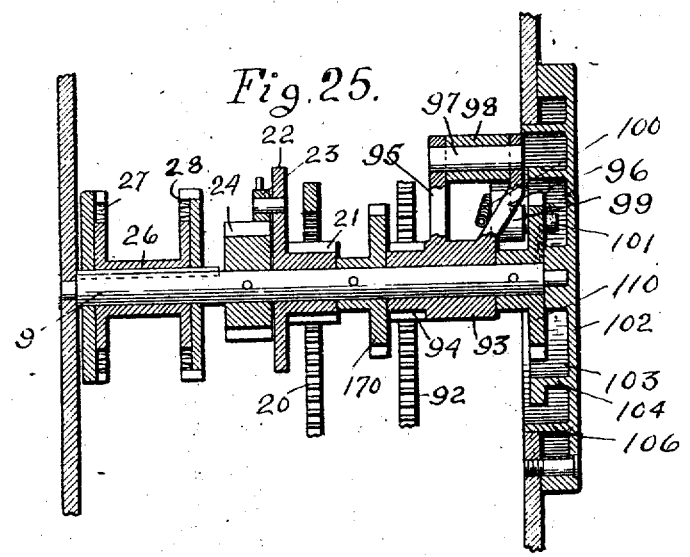

H. A. BOWERS.
CALCULATING MACHINE.
APPLICATION FILED JUNE 22, 1912. RENEWED DEC. 3, 1919.

1,347,245.

Patented July 20, 1920.
11 SHEETS—SHEET 10.

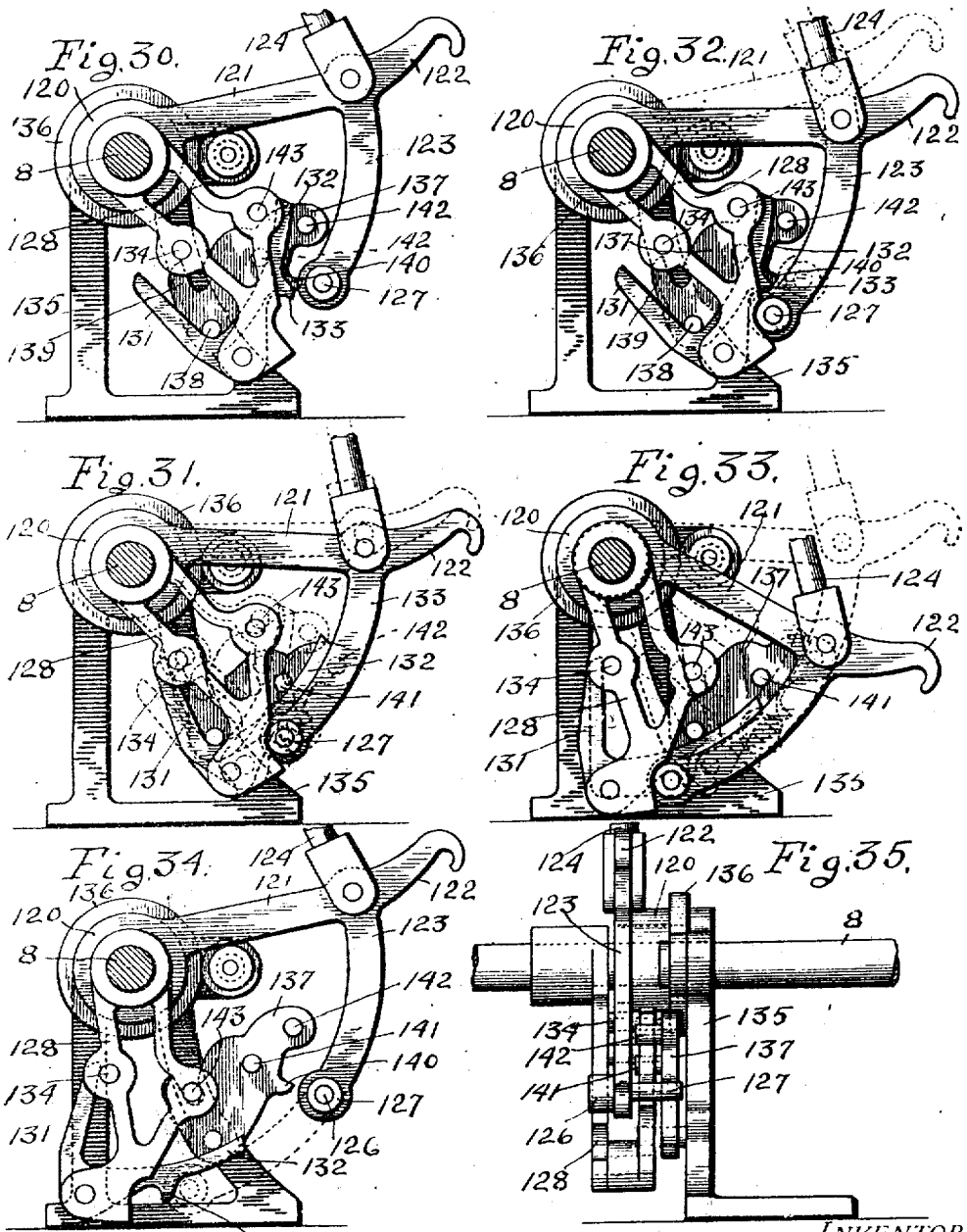

UNITED STATES PATENT OFFICE.

HIESTER A. BOWERS, OF READING, PENNSYLVANIA.

CALCULATING-MACHINE.

1,347,245.

Specification of Letters Patent. Patented July 20, 1920.

Application filed June 22, 1912, Serial No. 705,257. Renewed December 3, 1919. Serial No. 342,303.

*To all whom it may concern:*

Be it known that I, HIESTER A. BOWERS, a citizen of the United States, residing at Reading, in the county of Berks, State of Pennsylvania, have invented certain new and useful Improvements in Calculating-Machines, of which the following is a description, reference being had to the accompanying drawings, forming a part hereof.

My invention relates to calculating machines and particularly to that class of calculating machines which are adapted for use in connection with typewriting machines.

My invention has for its object to provide a machine of this character which shall be comparatively simple and inexpensive in construction, readily attached to and detached from a typewriting machine without change in the typewriting machine, adapted to be readily changed from adding to subtracting or from subtracting to adding, readily thrown into or out of operative connection with the keys of the typewriting machine, which may readily be adjusted to add or subtract columns of numbers anywhere on the page which is being written, in which accuracy and certainty of operation is insured by mechanism by which on the depression of a numeral key it will lock all of the other numeral keys against operation and will itself be prevented from returning to its initial position until it has completed its stroke, and in which the carrying from an index wheel of one denomination to the next index wheel shall be effected with certainty whether the machine is being used for addition or subtraction and without possibility of rotating the index wheels except when their rotation is necessary in the addition or subtraction.

With these and other objects in view my invention consists in the construction and combination of elements hereinafter described and claimed.

Referring to the drawings Figure 1, Sheet 1, is a front view of my calculating machine applied to a typewriting machine, the frame of the typewriting machine being broken away to show the operating mechanism.

Fig. 2, Sheet 2, is an end elevation of the machine shown in Fig. 1 looking from the left.

Fig. 3, Sheet 3, is an end view of the same looking from the right.

Fig. 4, Sheet 5, is an end view, on an enlarged scale, of the calculating mechanism.

Figs. 5, 6, 7, 8 and 9, Sheet 4, are detail views of the mechanism for shifting the calculating mechanism from addition to subtraction or from subtraction to addition, Figs. 5, 6 and 7 being respectively a side view, a top plan view and a rear view of the complete mechanism for this purpose, Fig. 8 being a detail view of the mechanism for locking the driven parts against movement during the shifting and Fig. 9 being a detail view of the means for holding the shifting mechanism against accidental movement.

Figs. 10, 11 and 12, Sheet 5, are respectively a side view, a front elevation and a top view of the mechanism for rotating the adding shaft.

Figs. 13, 14 and 15, Sheet 6, are respectively a side view, a front view and a top plan view of mechanism operated by the adding shaft for operating the full stroke mechanism.

Fig. 16 is a detail view of a locking device for the segment shown in Figs. 13, 14 and 15.

Figs. 17, 18, 19, 20, 21, and 22, Sheet 7, are detail views relating to the carrying mechanism and the traveling power wheel for operating the index wheels, Figs. 17 and 18 being respectively a side view and a front view of the carrying mechanism assembled. Fig. 19 is a rear view of the traveling power mechanism and Figs. 20, 21 and 22 are respectively a side, top plan and front view of the carrying mechanism.

Figs. 23 and 24, Sheet 8, are respectively a side view and a front view partly in section of the full stroke mechanism.

Fig. 25, Sheet 8, is a longitudinal section through the axis of the stationary rod on which the full stroke mechanism and other mechanism driven by the adding shaft is mounted.

Figs. 26 and 27, Sheet 9, are respectively a side view and top plan view of the mechanism for throwing the calculating mechanism into and out of operative position.

Fig. 28, Sheet 10, is a front view of a numeral key and the mechanism operated by it.

Fig. 29 is a side view of the keyboard showing the mechanism operated by the keys, the right hand end plate of the calculating machine and the right side of the keyboard frame of the typewriting machine being removed.

Figs. 30 to 34 inclusive are side views of the interlocking and full stroke mechanism for the numeral keys. Fig. 30 showing the mechanism in initial position, Figs. 31, 32 and 33 showing successive steps in the depression of the key returned to initial position and the interlocking mechanism ready to return to initial position.

Fig. 35 is a front elevation of the mechanism shown in Fig. 30.

Fig. 36 is a detail horizontal section taken on line S—S of Fig. 17.

Figure 1:
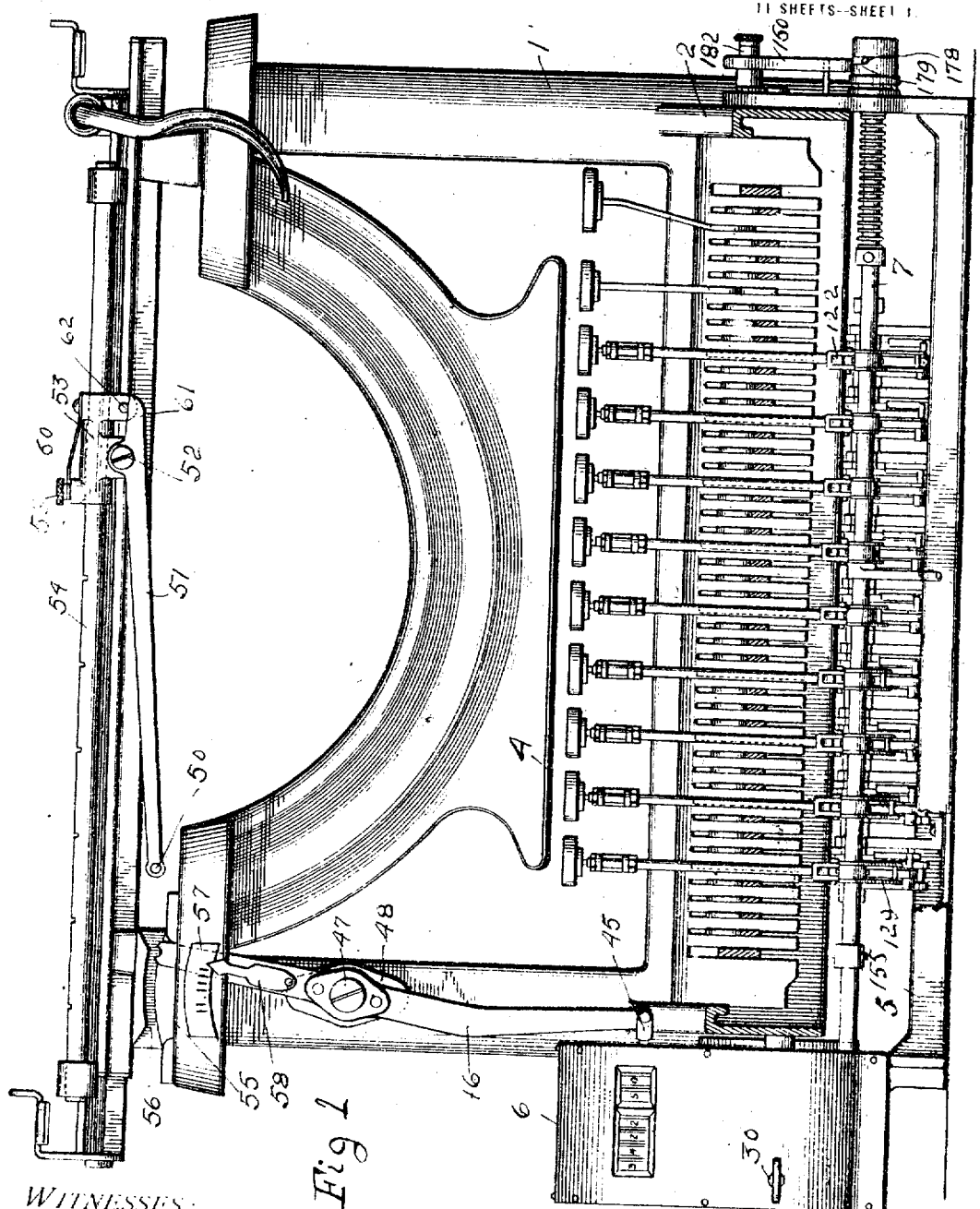
Figure 4:
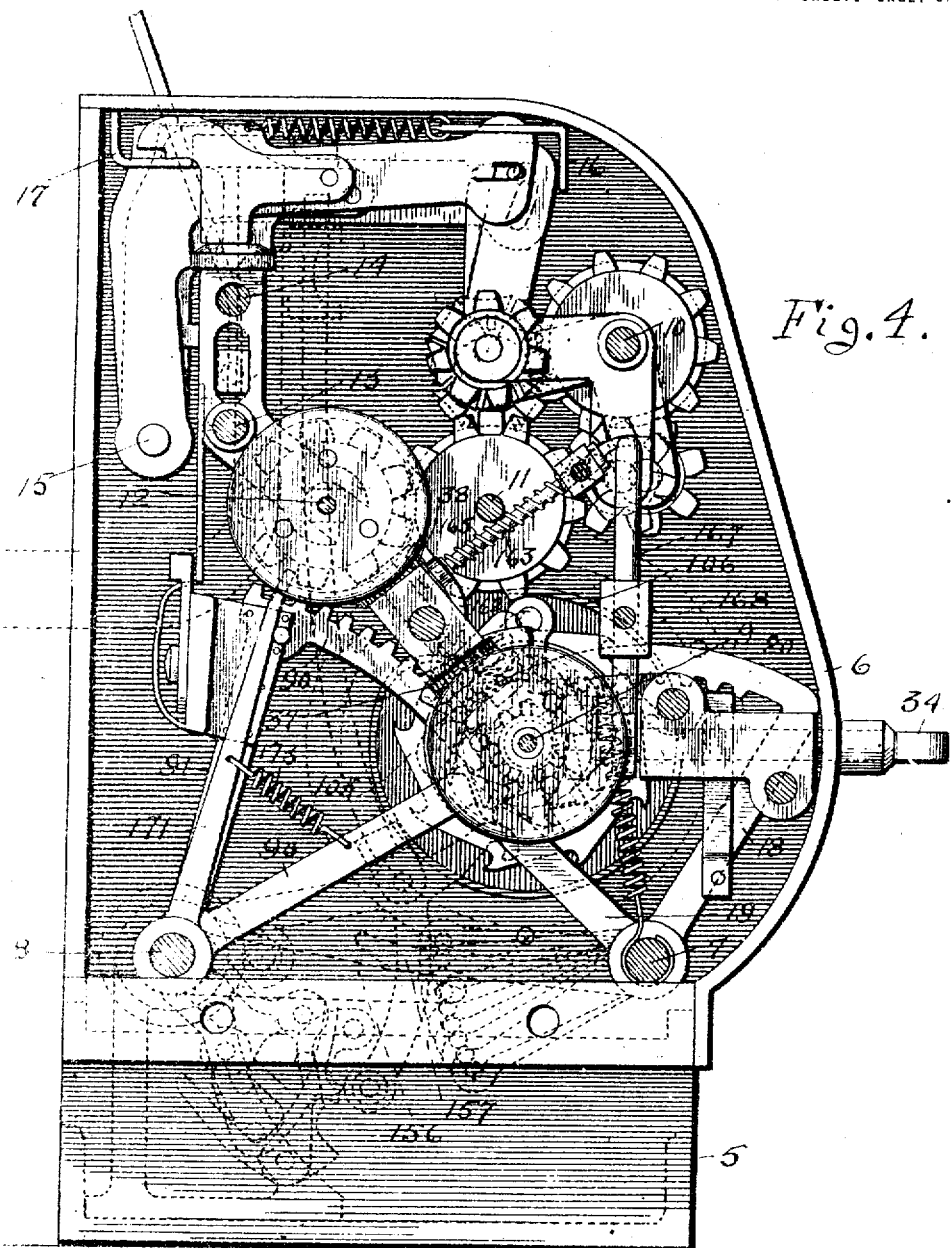

In the drawings 1 indicates the main frame of a typewriting machine, here shown as of the front strike type, having keyboard frame 2 and paper carriage 3. 4 indicates the numeral keys. In the machine shown a special key is used for the 1 instead of using as the 1 key the lower case 1, and this special 1 key is arranged in the same bank with the other numeral keys.

5 indicates the frame of the calculating machine extending across the typewriting machine beneath the keyboard frame and also extending to the left beyond the keyboard frame to support the casing 6 in which is contained the index wheels and the mechanism directly connected therewith.

Mounted in this frame 5 and extending from end to end thereof are two parallel rock shafts 7 and 8 of which the one nearest the front of the frame, marked 7, is the rock shaft though which, on the depression of a numeral key the index wheel selected by mechanism hereinafter described is caused to be rotated through a number of spaces depending on the numeral key depressed, and this rock shaft may be termed the differential rock shaft. The other rock shaft, marked 8 is rocked through the same arc by the depression of any one of the numeral keys and by its movement of rotation effects the rocking of the differential shaft, and also operates the full stroke mechanism, and may be termed the controller shaft.

Figure 26:
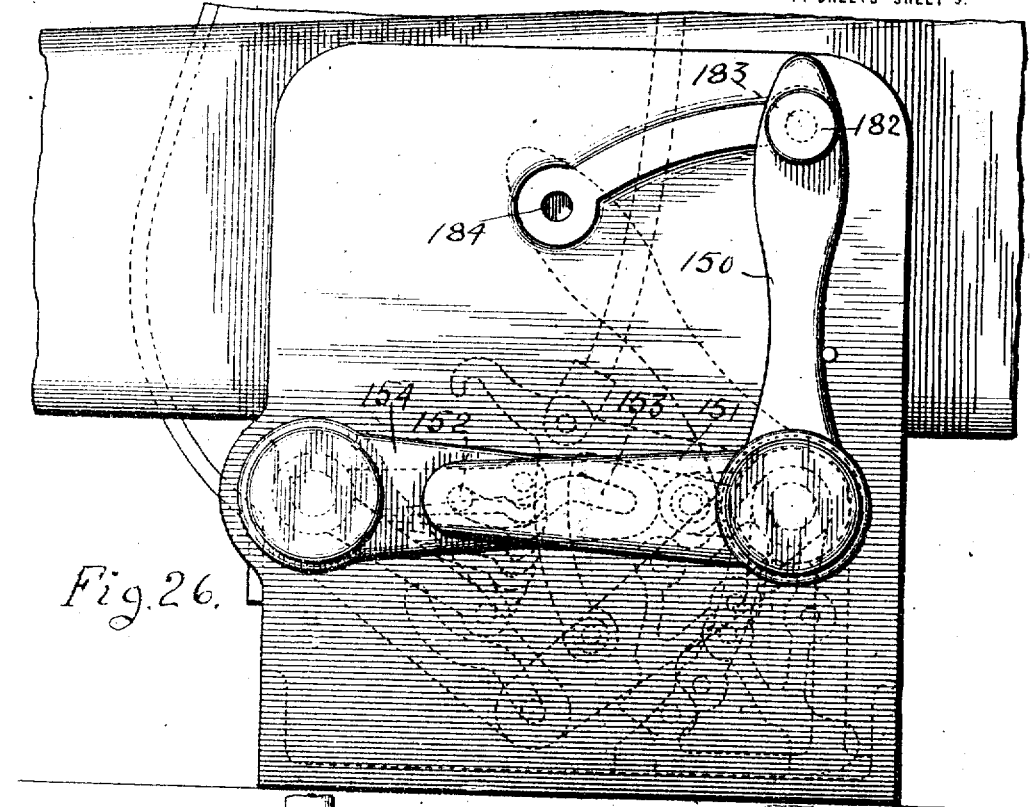
Figure 27:
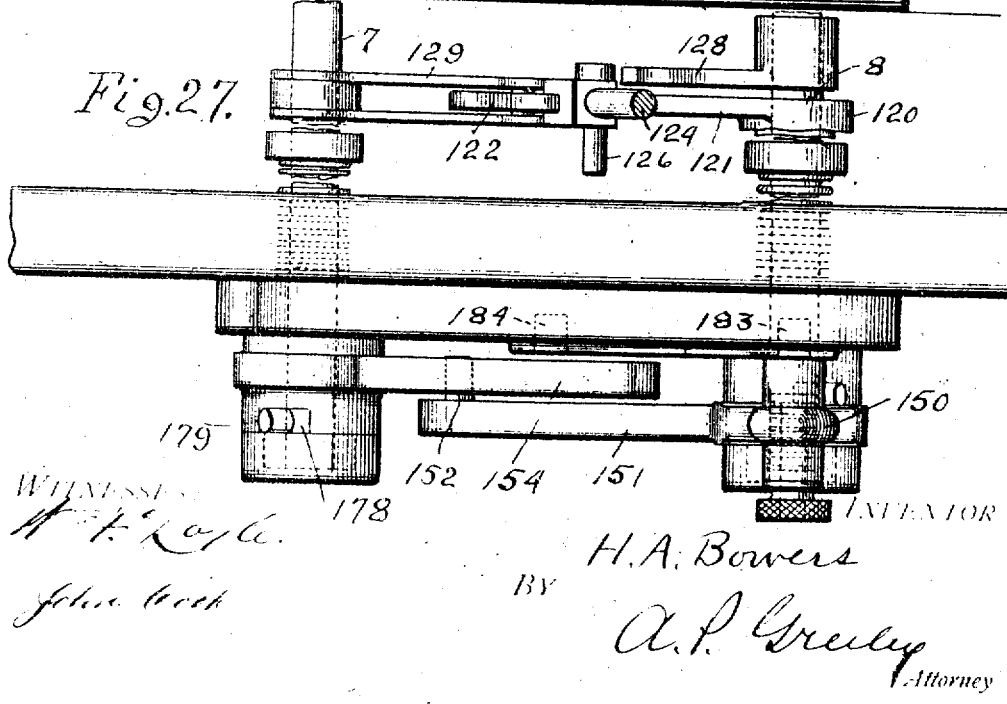
Figure 28:
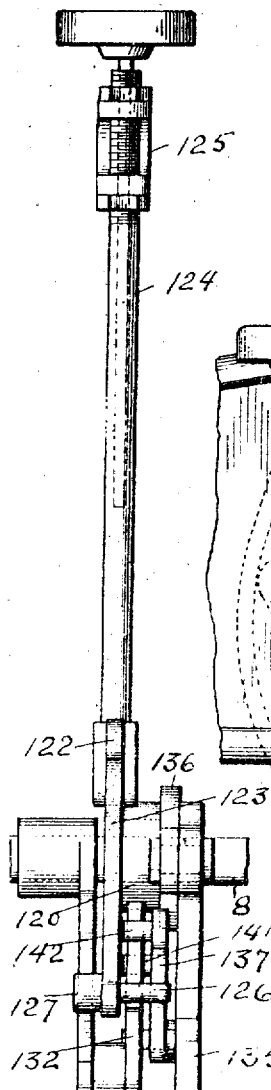
Figure 29:
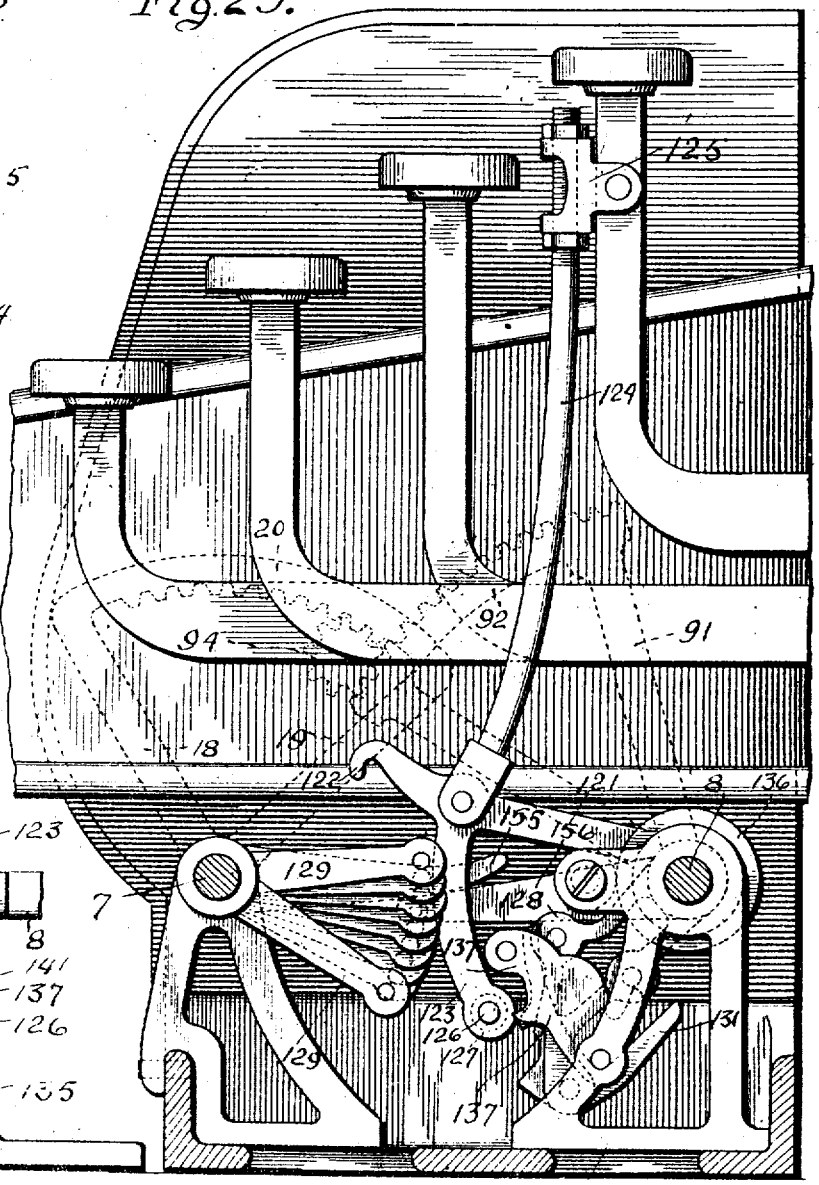

Mounted in the ends of the casing 6 is a shaft 9 (see Fig. 26) on which are mounted the several gears through which movement is transmitted from the rock shafts 7 and 8 to the several mechanisms by which the index wheels and other driven parts are operated and which may be termed the main or driving shaft. Above and forward of shaft 9 is a fixed shaft 10 on which the index wheels are mounted to rotate. Also above but to the rear of the shaft 9 is a fixed shaft 11 on which are mounted to rotate, the gears by which movement of rotation is transmitted to the index wheels. In rear of shaft 11 is a squared shaft 12 journaled at its ends in the end plates of the casing 6 which carries a power wheel which is movable longitudinally of the shaft and rotates therewith and transmits movement to the gears on shaft 11.

Above and to the rear of squared shaft 12 is a fixed rod 13 which with a fixed rod 14 directly above it serves as a guide for the frame which carries the power wheel on the squared shaft 12. In rear of and slightly below the fixed rod 13 is a fixed rod 15 which serves as a pivot for levers by which the index wheel to be rotated is unlocked as hereinafter described.

The ends of the casing 6 are rigidly secured together by a base plate which forms a part of the frame 5 and also by bars 16 and 17.

*The index wheel rotating mechanism.*

The differential shaft 7 is provided within the casing 6 with radial arms 18 and 19 carrying segment 20 having teeth on its inner face which mesh with a gear 21 (see Figs. 10, 11, 12 and 25) which is mounted to rotate freely on the main or driving shaft 9. This gear 21 carries an arm 22 on which is pivoted a pawl 23, the free end of which is adapted to engage the teeth of a ratchet wheel 24 which is fast on the shaft 9. A spring 25 holds the pawl in engagement with the teeth of the ratchet wheel when the gear 21 is rotated in one direction and permits the pawl to slip over the teeth when the gear 21 is rotated in the other direction by the return movement of the segment 20.

Splined on the shaft 9 is sleeve 26 (see Figs. 5, 6 7 and 25) carrying at its ends respectively crown gears 27 and 28 having inwardly extending teeth, the gear 28 also having radially extending teeth. A cam 29 on the end of a rod 30 is arranged between the gears 27 and 28 so that by rotating the rod 30 the sleeve 26 with its gears 27 and 28 will be shifted to the right or left as desired. The rod 30 is mounted to rotate in a lug 31 secured to the left hand end plate of the casing 6 and carries about midway of its length a short arm 32 against which bears a spring 33 to hold the rod against rotation except when sufficient force is used to cause the short arm 32 to press the spring back sufficiently to permit it to pass by it. At its outer end the rod 30 is provided with a finger piece 34 by which it may be rotated and which is marked "Add" on one face and "Sub" on the other.

Extending into the space between the gears 27 and 28 (see Figs. 5, 6 and 7) is an inclined shaft 35 journaled in a lug 36 carried by the left hand end plate of casing 6 and having secured to it on its forward end a pinion 37 and on its rear end a pinion 38. The diameter of the pinion 37 is such relative to the space between the gears 27 and 28 that when the rod 30 is turned to shift the sleeve 26 to the left the gear 28 will be in mesh with it while if the rod is turned so as to shift the sleeve to the right the gear 27 will be in mesh with it. Pinion 38 meshes with the teeth of a crown gear 39 fast on squared shaft 12.

Mounted to slide on squared shaft 12 is a power wheel or gear 40 (see Figs. 17, 19 and 21) which is arranged to mesh successively with the transmitting gears 41, the one with which it is for the time in mesh being itself in mesh with pinion 42 which is in mesh with the index wheel 43 which is to be rotated.

It will thus be seen that when the differential shaft is rocked by the depression of a numeral key the segment 20 will rotate the gear 21 which in turn through the pawl 23 will rotate the ratchet wheel 24 and the shaft 9 and sleeve 26 and through crown gear 27 or 28 will rotate the inclined shaft 35 which through pinion 38 and crown gear 39 will rotate the squared shaft 12 which through gears 41 and 42 will rotate the index wheel 43. As the differential shaft rocks back on the release of the numeral key the segment 20 rotates the gear 21 backward the pawl 23 slipping over the teeth of ratchet 24 without rotating it.

*The selecting and carrying mechanism.*

A slide 44 (see Figs. 19 and 21) is arranged to be movable on the guide rods 13 and 14 and is forked at its lower end to inclose the power gear 40. To this slide is connected the end of a rod 45 which extends through the righthand end plate of the casing 6. The other end of this rod is pivotally connected to the lower end of a lever 46 which is fulcrumed at 47 on a plate 48 secured to the left hand front post of the typewriting machine (see Fig. 1). The upper end of the lever is notched at 49 and extends up through a suitable guide slot into the path of a pin 50 on the end of an arm 51 which is pivoted at 52 to a sleeve 53 which is adjustable on a notched rod 54 carried by the paper carriage of the typewriting machine. Secured to the top plate of the typewriting machine is a bracket 55 having formed therein a groove 56 adapted to receive and guide the rear end of pin 50 so that the front end of the pin will engage notch 49 and thus cause the lever 46 to swing on its fulcrum 47 as the paper carriage moves in its step by step forward movement and also in its return movement.

An indicator scale 57 is arranged on the front of the top plate of the typewriting machine and a pointer 58 on the lever 46 sweeps over this scale and indicates which one of the index wheels is connected up for operation. The sleeve 53 is provided with a pin 59 for engaging the notches in the notched rod 54 which is pressed downward by spring 60. By raising this pin against the force of spring 60 the sleeve may be moved along the rod 54 to any point desired. The lever 51 has a tail piece 61 extending to the right of its pivot 52, and the sleeve 53 is provided with a pin 62 in position to have the tail piece 61 rest against it from below when the lever 51 is in the position in which it is shown in Fig. 1. When the calculating mechanism is not to be used the lever 51 may be thrown over to the right and will then rest on the pin 62.

When the lever 51 is in the position in which it is shown in Fig. 1 the forward movement of the carriage will bring the pin 50 into engagement with the notch 49 and will cause the lower end of the lever 46 to swing to the right drawing the slide 44 to the right and bringing the gear 40 into engagement with the transmitting gears 41 one after the other as the paper carriage moves forward step by step.

The index wheels 43 are mounted to rotate freely on the fixed shaft 10. On the fixed shaft 10 between each two adjacent index wheels is mounted a bell crank lever (see Figs. 17, 18, 20 and 22) having a downwardly extending arm 65, a horizontal arm 66 and an upward extension 67 from the horizontal arm. Journaled in the free end of the downwardly extending arm 65 is a pinion 42 in mesh with the index wheel and adapted to mesh with the transmitting gear 41. At the rear end of the horizontal arm 66 is journaled a short shaft 69 carrying at one end a Geneva stop gear 70, the concave faces of which are arranged to bear against a cylindrical face 71 formed at the side of the gear teeth of the index wheel. This cylindrical face bears the numerals and is cut away at a suitable point to form a notch 72 to permit the Geneva stop gear to turn at the proper time. At its opposite end in line with the index wheel of next higher denomination the sleeve is provided with a toothed gear 74 adapted to mesh with the teeth of the index wheel of next higher denomination.

A pinion 73 is mounted on the short shaft 69 with its teeth in mesh with the teeth of index wheel 43.

The arm 66 of the bell crank lever is normally down with the teeth of pinion 73 in mesh with the teeth of transmitting gear 41 and with a concave face of the Geneva gear bearing against the cylindrical face 70 of the index wheel. The transmitting gear is thus locked against rotation. On the side of the transmitting gear 41 is a pin 44 which is adapted to engage the Geneva gear and rotate it through one space. This takes place when the index wheel is completing a rotation. The rotation of the Geneva gear causes the pinion 74 which is in mesh with the index wheel 43 of next higher denomination to rotate through one space thus carrying from index wheel of lower denomination to one of higher denomination.

When the arm 66 is in raised position the index wheel 43 will be rotated by the transmitting gear 41 through the pinion 42. If the index wheel which is thus driven is rotated to a full rotation its notch 72 will cause the Geneva gear to rotate and through the gear 74 will rotate the index wheel next higher in denomination.

In order to swing the bell crank lever which carries the pinion 42 and 68 as above described the upwardly extending arm 67 is provided near its upper end with a pin 78 which engages a slot 77 in the forward end of a bent lever 78 which is pivoted at its lower end on fixed rod 15. A spring 79 connected at one end to the lever near the upper end of its vertical portion and at its other end connected to the cross bar 16 draws the lever forward and it is normally locked in forward position by a dog 80 pivoted to the horizontal member of the lever at 81 and adapted to engage the cross bar 17. This dog is preferably formed of sheet metal bent to inclose the horizontal member of the lever and extends downward at 82 into the path of the upper end of the slide 44 (see Figs. 17, 19 and 20).

The slide is preferably provided at its upper end with a disk 83 and is provided on its rear edge with a projection 84 and the vertical member of the lever 78 is provided with suitable bearing surfaces 85 and 86 against which the side of this disk and the rear end of this projection strike as the slide is moved across the calculating mechanism and swing the vertical member of the lever rearward thus raising the forward end of the horizontal member and, through the action of the cam slot 77 on the pin 76, causing the arms 67 and 66 of the bell crank lever to swing downward for the purpose above described.

The full stroke mechanism.

The rear rock shaft 8 or controller shaft, as has been above stated, is rocked always through the same arc whatever numeral key is depressed. This rock shaft is provided within the casing 6 with radial arms 90 and 91 which carry at their forward ends a toothed segment 92 (see Figs. 4, 13, 14 and 15). Mounted to rotate freely on the main or driving shaft 9 (see Figs. 23, 24 and 25) is a sleeve 93 having at its lefthand end a pinion 94 with which the teeth of the segment 92 are in mesh. The sleeve also carries radially extending arms 95 and 96 which at their outer ends support a short shaft 97 which serves as a bearing for sleeve 98 which is provided with a radial arm 99, the free end of which is adapted to rest against the sleeve 93 in rear of the arms 95 and 96 and is yieldingly held against the sleeve 93 by a spring 100 which is connected at its respective ends to the front of the sleeve 93 and to the sleeve 98. At its free end the arm 99 carries a pin 101 which extends to the right into a fixed cam member 102.

The fixed cam member 102 (see Figs. 4, 23, 24 and 25) is formed with a central cylindrical recess 103, the wall 104 of which is provided on its outer face with ratchet teeth 105. Outside the wall 104 is a cylindrical wall 106. The wall 104 is broken away at 107 and the outer wall 106 is broken away opposite the opening 107 but has one end 108 extended inward through the opening 107 and terminating in a tongue 108. The end of the wall 104 above the opening 107 is provided with a pivoted dog 109 the free end of which normally rests on the inwardly extending portion 108 of the wall 106.

Within the cylindrical recess 103 is arranged a ratchet wheel 110 which is fast on the shaft 9 and is rotated with it through such number of spaces as may be determined by the numeral key depressed.

When the mechanism is at rest the pin 101 lies in the position in which it is shown in Fig. 23, that is within the cylindrical recess opposite the opening 107 and immediately below the inwardly extending end 108 of the outer wall 106. Upon the depression of a numeral key the shaft 8 is rocked and through the segment 92 causes the sleeve 93 to begin to rotate. This causes the pin 101 to move downward between the periphery of the ratchet wheel 110 and the interior wall of the cylindrical recess. The spring 100 tends to pull the pin toward the shaft 9 and thus holds it against the periphery of the ratchet wheel and as soon as it has passed a tooth of the ratchet wheel it cannot return. After the rock shaft 8 has rocked through a greater or less arc depending upon the numeral key depressed it causes, through the mechanism hereinafter described, the rock shaft 7 to also rock and as this rocks its segment 20 causes the shaft 9 to rotate. This rotates the ratchet wheel 110 and pin 101 resting against a tooth of the ratchet wheel moves forward with it until just before the end of the depression of the numeral key it comes in contact with the tongue 108 which acts as a cam to lift the pin out of engagement with the tooth of the ratchet wheel and the final movement of depression of the numeral key causes the pin to lift the end of the dog 109 and to pass by it. The dog drops in rear of the pin and as the key is released and the parts start on their return movement, the pin is guided by the upper surface of the dog into the space between the outer face of the wall 104 and the cylindrical wheel 106 through which it passes freely until it reaches the inwardly extending end 108 by which it is guided inward into its initial position.

Fast on the shaft 9 between the sleeve 93 and the pinion 21 is a ratchet wheel 111 (see Figs. 13, 14 and 25) and on the rock shaft 8 is a pawl 112 which is normally drawn forward against a stop pin 113 on arm 91 by a spring 114 the forward end of which is connected to arm 90, and which is prevented from swinging rearward more than a limited distance by a stop block 115 carried by the arm 91. When the segment 92 is just completing its downward movement the end of pawl 112 is brought into the path of a tooth of ratchet wheel 111 preventing further rotation of the shaft 9 thus preventing any possible overthrow of the operating mechanism.

*The actuating and differential mechanism.*

Mounted to rotate freely on the rock shaft 8 are a series of sleeves 120, one for each numeral key, each provided with a forwardly extending radial arm 121 having a hook 122 at its forward end and having a downwardly extending arc shaped arm 123 (see Figs. 26 to 35 inclusive). To the arm 121 is pivotally connected an upwardly extending actuating rod 124, the upper end of which is secured by a clamp 125 to a numeral key of the typewriting machine. At the lower end of the arm 123 is a pin 126 extending to the right and also to the left and provided to the left of the arm with a roller 127.

Fast on the rock shaft 8 is a series of radial arms 128 one for each of the numeral keys each arranged in the path of one of the rollers 127 but so arranged that the numeral key depressed will move downward a short distance before the roller strikes the arm 128 and causes it to swing to rock the rock shaft 9.

On the rock shaft 7 is arranged a series of pairs of radial rearwardly extending arms 129 each pair carrying between their ends a pin 130 in the path of one of the hooks 122 of the arms 121. The pairs of arms 129 are arranged at such angles to the horizontal when the parts are in initial position, that the several numeral keys will rock the rock shaft 7 through the proper arc to effect the rotation of an index wheel through the proper number of spaces.

*The key interlocking mechanism.*

Pivoted to the depending arm 128 at its lower end on its right hand side is a bell crank lever (see Figs. 30 to 35 inclusive) having an upwardly extending arm 131 and a forwardly extending arm 132, the latter having on its under edge about midway of its length, a downwardly extending projection or tooth 133. The arm 128 is provided about midway of its length with a pin 134 in the path of the upper end of the arm 131 of the bell crank lever. A bracket 135 secured to the bed of the frame 5 carries a bearing 136 for the shaft 8 and to this bracket at 138 is pivoted a locking dog 137, the upper surface of which is cam shaped as shown in Fig. 34 with an upwardly extending finger 139 at its rear end and a downwardly extending projection or tooth 140 on its lower edge. This locking dog also carries pins 141 and 142 projecting to the left. The depending arm 128 is provided near its forward edge about midway of its length with a pin 143 which extends to the right and is adapted to engage the upper edge of the locking dog 137.

In operating the parts being in the positions shown in Fig. 30, on the depression of a numeral key it depresses the arm 121 connected to it by actuating rod 124, carrying down with it the depending arm 123 carrying the pin 127. As this moves downward the portion of it projecting to the right will pass the tooth 140 of the locking dog 137 and tooth 133 of the arm 132 of the bell crank lever and as the roller 127 strikes the forward edge of the lower end of the depending arm 128, it will swing it to the rear rocking the shaft 8. As the shaft begins to rock it will swing all of the depending arms 128 downward. This will cause the pin 143 of each of these depending arms 128 to travel along the upper edge of the locking dog adjacent to it causing it to swing on its pivot 138 so as to project its tooth 140 into the path of the pin 127 of the adjacent depending arm 123 thus locking the several numeral keys other than the one depressed, against depression. The swinging of the locking dog 137 through pin 141 acting against the upper or rear edge of arm 132 causes it to swing downward and to project its tooth 133 also into the path of pin 127 also serving to prevent the operation of the several numeral keys other than the one depressed.

The pin 127 of the key depressed passes the tooth 140 of the locking dog 137 and also passes the tooth 133 of the arm 132 and as it continues to move downward the further swinging of the locking dog projects its tooth 140 outward above the pin 127 and through the action of its pin 141 causes the arm 132 to swing downward so that its tooth 133 is projected outward above the pin 127 (see Fig. 31) thus preventing the return of the numeral key until it has completed its full stroke. As the depending arm 128 nears the limit of its full rearward swing it will draw the bell crank lever rearward so that the end of its arm 32 is to the rear of pin 142, pin 134 then strikes the arm 131 rocking the bell crank lever so that the arm 132 swings upward, lifting its tooth 133 out of the path of the pin 127. At the same time the pin 143 having been brought against the finger 139 has tilted the forward end of the locking dog 137 upward thus carrying its tooth 140 upward out of the path of the pin 127. The path of the pin 127 in the above described space between the second and third index wheels the lower end of this arm will be in the path of the dog 157 and will prevent the forward swing of the segment 92 and will thus prevent the depressing of any numeral key. In order that the dog may pass the arm 160 as the segment returns to initial position after being swung forward when the second or tenth index wheel was operated the head of the dog is made wedge shaped as shown in Figs. 15 and 16 and the lower end of arm 160 is made of such width that the point of the wedge will pass to one side of the lower end of the arm and the dog will be caused to swing on its pivot sufficiently to pass the arm.

*The shift lock.*

In shifting the calculating mechanism from adding to subtracting position or vice versa it is important that there should be no possibility of any movement of the mechanism connected with the index wheels. In order to guard against such movement a locking pawl 162 is provided carried by a rock shaft 163 (see Figs. 5, 6, 7, and 8) which has a bearing at its lower end in the bearing block or lug 36 and near its upper end has a bearing in a lug 164. This pawl 162 is adapted when swung in one direction to engage the teeth of pinion 37 and lock it against rotation and to be disengaged from such teeth when swung in the opposite direction. A spring 165 coiled on the rock shaft 163 holds the pawl normally out of engagement with the teeth of gear 28. A cam 166 on the rod 30 is adapted to act, when rod 30 is rotated to lift a rod 167 mounted to slide vertically in a suitable lug 168 and bearing at its upper end against an arm 169 on rock shaft 163. When the rod 30 is rotated to shift the gears 27 and 28 its cam 166 lifts the rod 167 and causes it to act on arm 169 to rock the rock shaft 163 and swing the pawl 162 into engagement with pinion 37 holding the pinion and, of course, the entire train of gearing between it and the index wheels locked during the shifting the return movement of the numeral key is then unobstructed and the key may return to its initial position.

*The connecting and disconnecting mechanism.*

For the purpose of disconnecting the calculating mechanism from the numeral keys so that the latter may be fully operated without rocking the rock shaft, a bell crank lever (see Figs. 1, 3, 26 and 27) is pivoted to the left of the key board in line with rock shaft 7 having its upwardly extending arm 150 shaped to form a handle and having its forwardly extending arm 151 provided with a pin 152 which engages a slot 153 in an arm 154 carried on a sleeve 177 mounted on the end of rock shaft 7, and having a slot 178 formed therein into which extends a pin 179 on the rock shaft so arranged that the rock shaft may rock independently of the sleeve. By rocking this bell crank lever forward the pin 152 causes the arm 154 to swing downward. This carries the end of slot 178 against the pin 179 and causes the shaft to rock carrying the differential arms on rock shaft 7 downward and through the action of a rearwardly extending arm 155 on rock shaft 7 on a forwardly extending arm 156 on rock shaft 8 causes the depending arms 128 to rock to their full rearward position thus moving the locking dogs 137 and the arms 132 of the bell crank lever into position to permit the numeral keys to be depressed without either locking the other keys or being locked against return movement.

A return movement of the bell crank lever swings the arm 154 upward and the rock shafts 7 and 8 are returned to initial position by springs 180 and 181 respectively.

The bell crank lever is held in the position to which it is shifted by a spring pin 182 carried by the arm 150 and adapted to enter either one of two recesses 183 and 184 in the right hand end plate of the frame 5.

*The decimal point lock.*

The index wheels are perfectly arranged as shown with a space between the second and third index wheels from the right for writing in the decimal point. It is important that there should be no possibility of operating a numeral key when the paper carriage is at the point in its travel at which the period key should be operated to print the decimal point. In order to make this impossible the stop block 115 on arm 91 (see Figs. 13, 14, 15 and 16) is provided with a dog 157 pivoted at 158 to the rear face of the block and held normally in upright position by spring 159 and the slide 44 is provided with a depending arm 160 of such length that when the slide is in line with the above described space between the second and third index wheels the lower end of this arm will be in the path of the dog 157 and will prevent the forward swing of the segment 92 and will thus prevent the depressing of any numeral key. In order that the dog may pass the arm 160 as the segment returns to initial position after being swung forward when the second or tenth index wheel was operated the head of the dog is made wedge shaped as shown in Figs. 15 and 16 and the lower end of arm 160 is made of such width that the point of the wedge will pass to one side of the lower end of the arm and the dog will be caused to swing on its pivot sufficiently to pass the arm.

The shift lock.

In shifting the calculating mechanism from adding to subtracting position or vice versa it is important that there should be no possibility of any movement of the mechanism, connected with the index wheels. In order to guard against such movement a locking pawl 162 is provided carried by a rock shaft 163 (see Figs. 5, 6, 7 and 8) which has a bearing at its lower end in the bearing block or lug 36 and near its upper end has a bearing in a lug 164. This pawl 162 is adapted when swung in one direction to engage the teeth of pinion 37 and lock it against rotation and to be disengaged from such teeth when swung in the opposite direction. A spring 165 coiled on the rock shaft 163 holds the pawl normally out of engagement with the teeth of gear 28. A cam 166 on the rod 30 is adapted to act, when rod 30 is rotated to lift a rod 167 mounted to slide vertically in a suitable lug 168 and bearing at its upper end against an arm 169 on rock shaft 163. When the rod 30 is rotated to shift the gears 27 and 28 its cam 166 lifts the rod 167 and causes it to act on arm 169 to rock the rock shaft 163 and swing the pawl 162 into engagement with pinion 37 holding the pinion and, of course, the entire train of gearing between it and the index wheels locked during the shifting movement. As soon as the teeth of gear 27 or gear 28 are in engagement with pinion 37 the cam 166 permits the rod 167 to drop and the spring 165 rotates the rock shaft back to initial position swinging the pawl away from the pinion.

Overthrow preventing mechanism.

For the purpose of preventing any overthrow of the shaft 9 and the index wheels operated by it, a ratchet wheel 170 is provided which is fast on the main or driving shaft 9 and a stop pawl 171 is provided on the rock shaft 8 which is held against pin 172 on segment 92 by spring 173. As the arms 90 and 91 carrying the segment 92 near the limit of their forward swing they carry the end of the stop pawl into contact with the teeth of the ratchet wheel 170 the pawl yielding as its end strikes the tip of a tooth and as the arm completes its stroke and the tip of the tooth passes from under the end of the pawl, the end of the pawl springs into position to meet the radial face of the following tooth thus locking the ratchet wheel and shaft 9 against further rotation.

On the release of the numeral key depressed it will be returned to initial position by the usual spring provided for this purpose in typewriting machines.

A pawl 175 pivoted to the lug 31 had its free end in engagement with the teeth of ratchet wheel 24 so that the shaft 9 cannot be rotated backward on the return of the rock shaft 7 to initial position.

It will be understood that I do not desire to be limited to the precise construction or arrangement of parts shown or described as it is obvious that these may be modified and changed so far as form and details of construction and arrangement without departing from the spirit of the invention.

Having thus described my invention what I claim is:

1. In a calculating machine a series of index wheels, a transmitting gear for each index wheel, a pinion between the index wheel and transmitting gear in mesh with the index wheel but normally out of mesh with the transmitting gear, a sliding gear arranged to be brought in mesh with each of the transmitting gears in turn, means for rotating the sliding gear, a slide for shifting the gear and means operated by the slide for moving the pinion into mesh with the transmitting gear to be operated by the sliding gear.

2. In a calculating machine a series of index wheels, a transmitting gear for each index wheel, a pinion between the index wheel and transmitting wheel in mesh with the index wheel but normally out of mesh with the transmitting gear, a second pinion between the index wheel and the transmitting gear normally in mesh with both the index wheel and the transmitting gear, a sliding gear arranged to be brought into mesh with each of the transmitting gears in turn, means for rotating the sliding gear, a slide for shifting the sliding gear and means operated by the slide for moving the first pinion into mesh with the transmitting gear and simultaneously moving the second pinion out of mesh with the transmitting gear.

3. In a calculating machine, a series of index wheels, a shaft on which the index wheels are mounted to rotate, a transmitting gear for each index wheel, a bell crank lever for each index wheel mounted to swing on the shaft on which the index wheels are mounted, a pinion carried by each arm of the bell crank lever in mesh with the index wheel and each adapted to mesh also with the transmitting gear, and means for swinging the bell crank lever to bring one or the other of the pinions into mesh with the transmitting gear and means for rotating the transmitting gear.

4. In a calculating machine, a series of index wheels, a shaft on which the index wheels are mounted to rotate, a transmitting gear for each index wheel, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, and means for unlocking the bell crank lever and swinging it into position to bring the pinion on the rearwardly extending arm into mesh with the transmitting gear.

5. In a calculating machine a series of index wheels, a shaft on which the index wheels are mounted to rotate, a transmitting gear for each index wheel, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, a slide movable parallel with the line of the shaft on which the index wheels are mounted, means for moving the slide and means operated by the slide for unlocking the bell crank lever and swinging it into position to bring the pinion on the upwardly extending arm into mesh with the transmitting gear.

6. In a calculating machine, a series of index wheels, a shaft on which the index wheels are mounted to rotate, a transmitting gear for each index wheel, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, a slide movable parallel with the line of the shaft on which the index wheels are mounted, means for moving the slide and means operated by the slide for unlocking the bell crank lever and swinging it into position to bring the pinion on the upwardly extending arm into mesh with the transmitting gear, a sliding gear movable with the slide into mesh with each of the transmitting gears in succession and means for rotating the sliding gear.

7. In a calculating machine for use with a typewriting machine having a paper carriage and numeral keys, a series of index wheels, a shaft on which the index wheels are mounted to rotate, a transmitting gear for each index wheel, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, a slide movable parallel with the line of the shaft on which the index wheels are mounted, means operated by the paper carriage for moving the slide, and means operated by the slide for unlocking the bell crank lever and swinging it into position to bring the pinion on the upwardly extending arm into mesh with the transmitting gear.

8. In a calculating machine for use with a typewriting machine having a paper carriage and numeral keys, a series of index wheels, a shaft on which the index wheels are mounted to rotate, a transmitting gear for each index wheel, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, a slide movable parallel with the line of the shaft on which the index wheels are mounted, means operated by the paper carriage for moving the slide and means operated by the slide for unlocking the bell crank lever and swinging it into position to bring the pinion on the upwardly extending arm into mesh with the transmitting gear, a sliding gear movable with the slide into mesh with each of the transmitting gears in succession and means operated by the numeral keys for rotating the sliding gear.

9. In a calculating machine for use with a typewriting machine having a paper carriage and numeral keys in combination with the paper carriage and numeral keys, a series of index wheels, a transmitting gear for each index wheel, a pinion between the index wheel and transmitting gear in mesh with the index wheel but normally out of mesh with the transmitting gear, a sliding gear arranged to be brought in mesh with each of the transmitting gears in turn, means operated by the numeral keys for rotating the sliding gear, a slide for shifting the sliding gear and means operated by the paper carriage for operating the slide for moving the pinion into mesh with the transmitting gear to be operated by the sliding gear.

10. In a calculating machine for use with a typewriting machine having a paper carriage and numeral keys, in combination with the paper carriage and numeral keys, a series of index wheels, a transmitting gear for each index wheel, a pinion between the index wheel and transmitting wheel in mesh with the index wheel but normally out of mesh with the transmitting gear, a second pinion between the index wheel and the transmitting gear normally in mesh with both the index wheel and the transmitting gear, a sliding gear arranged to be brought into mesh with each of the transmitting gears in turn, means operated by the numeral keys for rotating the sliding gear, a slide operated by the paper carriage for shifting the sliding gear and means operated by the slide for moving the first pinion into mesh with the transmitting gear and simultaneously moving the second pinion out of mesh with the transmitting gear.

11. In a calculating machine for use with a typewriting machine having a paper carriage and numeral keys, in combination with the paper carriage and numeral keys, a series of index wheels, a shaft on which the index wheels are mounted to rotate, a transmitting gear for each index wheel, a bell crank lever for each index wheel mounted to swing on the shaft on which the index wheels are mounted, a pinion carried by each arm of the bell crank lever in mesh with the index wheel and each adapted to mesh also with the transmitting gear, and means operated by the paper carriage for swinging the bell crank lever to bring one or the other of the pinions into mesh with the transmitting gear and means operated by the numeral keys for rotating the transmitting gear.

12. In a calculating machine for use with a typewriting machine, having a paper carriage and numeral keys, in combination with the paper carriage and numeral keys, a series of index wheels, a shaft on which the index wheels are mounted to rotate, a transmitting gear for each index wheel, means operated by the numeral keys for rotating the transmitting gear, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, and means operated by the paper carriage for unlocking the bell crank lever and swinging it into position to bring the pinion on the rearwardly extending arm into mesh with the transmitting gear.

13. In a calculating machine for use with a typewriting machine, having a paper carriage and numeral keys, in combination with the paper carriage and numeral keys, a series of index wheels, a shaft on which the index wheels are mounted to rotate, a transmitting gear for each index wheel, means operated by the numeral keys for rotating the transmitting gear, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, a slide movable parallel with the line of the shaft on which the index wheels are mounted, means operated by the paper carriage for moving the slide and means operated by the slide for unlocking the bell crank lever and swinging it into position to bring the pinion on the upwardly extending arm into mesh with the transmitting gear.

14. In a calculating machine for use with a typewriting machine, having a paper carriage and numeral keys, in combination with the paper carriage and numeral keys, a series of index wheels, a shaft on which the index wheels are mounted to rotate, a transmitting gear for each index wheel, means operated by the numeral keys for rotating the transmitting gear, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, a slide movable parallel with the line of the shaft on which the index wheels are mounted, means for moving the slide and means operated by the slide for unlocking the bell crank lever and swinging it into position to bring the pinion on the upwardly extending arm into mesh with the transmitting gear, a sliding gear movable with the slide into mesh with each of the transmitting gears in succession and means operated by the numeral keys for rotating the sliding gear.

15. In a calculating machine for use with a typewriting machine having a paper carriage and numeral keys, in combination with the paper carriage and numeral keys, a series of index wheels, a shaft on which the index wheels are mounted to rotate, a transmitting gear for each index wheel, means operated by the numeral keys for rotating the transmitting gear, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, a slide movable parallel with the line of the shaft on which the index wheels are mounted, means operated by the paper carriage for moving the slide, and means operated by the slide for unlocking the bell crank lever and swinging it into position to bring the pinion on the upwardly extending arm into mesh with the transmitting gear.

16. In a calculating machine for use with a typewriting machine having a paper carriage and numeral keys, in combination with the paper carriage and numeral keys, a series of index wheels, a shaft on which the index wheels are mounted to rotate, a transmitting gear for each index wheel, a bell crank lever for each index wheel mounted to swing on the shaft on which the index wheels are mounted and having a rearwardly extending arm and a downwardly extending arm, a pinion carried by each arm in mesh with the index wheel and adapted to mesh with the transmitting gear, means for swinging the bell crank lever into position to bring the pinion carried by the downwardly extending arm into mesh with the transmitting gear, means for locking the bell crank lever in such position, a slide movable parallel with the line of the shaft on which the index wheels are mounted, means operated by the paper carriage for moving the slide and means operated by the slide for unlocking the bell crank lever and swinging it into position to bring the pinion on the upwardly extending arm into mesh with the transmitting gear, a sliding gear movable with the slide into mesh with each of the transmitting gears in succession and means operated by the numeral keys for rotating the sliding gear.

17. The combination with a shaft and means for rotating it, of a ratchet wheel fast on the shaft, a sleeve mounted to rotate on the shaft carrying a spring pressed pawl adapted to travel over the teeth of the ratchet wheel in one direction, and means for rotating the sleeve simultaneously with the rotation of the shaft.

18. The combination with a shaft, means for rotating it comprising a rock shaft and means for rotating it through different arcs, of a ratchet wheel mounted to rotate with the shaft and a sleeve mounted to rotate on the shaft carrying a spring pressed pawl adapted to travel over the teeth of the ratchet wheel in one direction only and means for rotating the sleeve simultaneously with the rotating of the shaft but always throughout the same arc.

19. The combination of a shaft, means for rotating it through different arcs a ratchet wheel mounted on the shaft to rotate with it, a plate having a recess concentric with the shaft in which the ratchet wheel rotates, a sleeve mounted to rotate on the shaft carrying a spring pressed pawl extending into the recess and arranged to travel over the teeth of the ratchet wheel and means for rotating the sleeve simultaneously with the rotation of the shaft but always throughout the same arc.

20. The combination of a shaft, means for rotating it through different arcs, a ratchet wheel mounted on the shaft to rotate with it, a plate having a central recess concentric with the shaft in which the ratchet wheel rotates the wall of the recess having an opening at one point, a sleeve mounted to rotate on the shaft carrying a spring pressed pawl adapted to extend into the recess and to travel over the teeth of the ratchet wheel, means for rotating the sleeve to carry the pawl to the opening in the wall of the recess and means for disengaging the pawl from the ratchet wheel and directing it through the opening and means for closing the opening against the return of the pawl through it.

21. The combination with a shaft, means for rotating it in one direction only, a ratchet wheel mounted on the shaft to rotate with it, a plate having a central recess concentric with the shaft in which the ratchet wheel rotates having its wall provided on its exterior with ratchet teeth having a direction opposite to that of the teeth of the ratchet wheel and having an opening at one point through it, a sleeve mounted to rotate on the shaft carrying a pawl adapted to extend into the recess and to travel over the teeth of the ratchet wheel, means for rotating the sleeve, means for directing the pawl through the opening in the recess wall out of engagement with the teeth of the ratchet wheel, means for closing the opening against the return of the pawl to cause it to travel over the ratchet teeth on the exterior of the recess wall on its return movement.

22. The combination with a key of a rock shaft arranged to be rotated by the depression of the key, a second rock shaft operated by the rotation of the first rock shaft, a main shaft arranged to be operated in one direction only by the second rock shaft and to operate index wheels, a ratchet wheel mounted to rotate with the main shaft, a sleeve mounted to rotate on the main shaft carrying a pawl arranged to travel over the teeth of the ratchet wheel, means for rotating the sleeve by the rotation of the first rock shaft and means for disengaging the pawl from the teeth of the ratchet wheel on the completion of the full stroke of the key.

23. In a calculating machine for use with a typewriting machine having numeral keys, the combination with the numeral keys of a controller shaft, means operated by the keys for rocking the controller shaft, a main shaft, a sleeve mounted to rotate on the shaft carrying a spring pressed pawl, a ratchet wheel fast on the main shaft arranged to have its teeth engage the spring pressed pawl, means operated by the controller shaft for rotating the main shaft and means for disengaging the spring pressed pawl from the ratchet wheel on the completion of the rocking movement of the controller shaft.

24. In a calculating machine for use with a typewriting machine having numeral keys, the combination with the numeral keys of a controller shaft, means operated by the keys for rocking the controller shaft, a main shaft, a sleeve mounted to rotate on the shaft carrying a spring pressed pawl, a ratchet wheel fast on the main shaft arranged to have its teeth engage the spring pressed pawl, means operated by the controller shaft for rotating the main shaft and means for disengaging the spring pressed pawl from the ratchet wheel on the completion of the rocking movement of the controller shaft, and means operated by the controller shaft for preventing return movement of the numeral key until the controller shaft has completed its movement.

25. The combination with a main shaft and means for rotating it in one direction only, of a ratchet wheel fast on the shaft, a sleeve mounted to rotate on the shaft carrying a spring pressed pawl arranged to travel over and be engaged by the teeth of the ratchet wheel, a fixed circular wall surrounding the ratchet wheel having an opening therein at one point, means for disengaging the pawl from the ratchet wheel and directing it outward through the opening in the wall and means for rotating the sleeve.

26. The combination with a main shaft and differential means for rotating it in one direction only, of a ratchet wheel fast on the shaft, a sleeve mounted to rotate on the shaft carrying a spring pressed pawl arranged to travel over and be engaged by the teeth of the ratchet wheel, a fixed circular wall surrounding the ratchet wheel having an opening therein at one point, means for disengaging the pawl from the ratchet wheel and directing it outward through the opening in the wall, means for rotating the sleeve in one direction and means for returning it to initial position after the pawl has passed through the opening in the wall.

27. The combination with a main shaft and means for rotating it in one direction only, of a ratchet wheel fast on the shaft, a sleeve mounted to rotate on the shaft carrying a pawl arranged to travel over and be engaged by the teeth of the ratchet wheel, an inner fixed circular wall surrounding the ratchet wheel having an opening at one point therein, means for disengaging the pawl from the teeth of the ratchet wheel and directing it through the opening in the wall when moved in one direction, an outer wall surrounding the fixed circular wall to form between it and the fixed circular wall for the passage of the pawl on its return movement and means for directing the pawl inward through the opening in the inner wall on the completion of the return movement, means for rotating the sleeve in one direction and means for returning it to initial position.

28. The combination with a main shaft and means for rotating it in one direction only, of a ratchet wheel fast on the shaft, a sleeve mounted to rotate on the shaft carrying a pawl arranged to travel over and be engaged by the teeth of the ratchet wheel, an inner fixed circular wall surrounding the ratchet wheel having an opening at one point therein, means for disengaging the pawl from the ratchet wheel and directing it through the opening in the wall when moved in one direction, a pivoted dog adapted to prevent the return of the pawl through the opening, an outer wall surrounding the inner wall and spaced therefrom to form a passage for the pawl on its return movement, means for directing the pawl inward through the opening in the inner wall on the completion of its return movement, means for rotating the sleeve in one direction and means for returning it to initial position.

29. The combination with a main shaft and means for rotating it in one direction only, of a ratchet wheel fast on the shaft, a sleeve mounted to rotate on the shaft carrying a pawl arranged to travel over and be engaged by the teeth of the ratchet wheel, an inner fixed circular wall surrounding the ratchet wheel having an opening at one point therein, means for disengaging the pawl from the ratchet wheel and directing it through the opening in the wall when moved in one direction, a pivoted dog adapted to prevent the return of the pawl through the opening, an outer wall surrounding the inner wall and spaced therefrom to form a passage for the pawl on its return movement, means for directing the pawl inward through the opening in the inner wall on the completion of its return movement, means for rotating the sleeve in one direction and means for returning it to initial position, the inner wall being provided on its exterior with ratchet teeth pointing in the opposite direction from those of the ratchet wheel.

30. In a calculating machine for use with a typewriting machine having numeral keys, the combination with a numeral key of a controller shaft an arm mounted to swing on the controller shaft, an actuating rod connecting the arm with the key, a depending arm on the swinging arm, an arm fast on the controller shaft in the path of movement of the depending arm and means operated by the arm fast on the controller shaft for preventing the return movement of the swinging arm until the key has been fully depressed.

31. In a calculating machine for use with a typewriting machine, having numeral keys the combination with the numeral keys, of a controller shaft, a series of arms, one for each numeral key mounted to swing on the controller shaft, each connected with a numeral key and provided with a depending arm, a series of arms fast on the controller shaft one in the path of each depending arm, and means operated by the movement of the arms fast on the controller shaft by which a stop is interposed in the path of each of the projections except that of the swinging arm connected with the key depressed.

32. In a calculating machine for use with a typewriting machine having numeral keys, the combination with the numeral keys of a controller shaft, a series of arms one for each numeral key mounted to swing on the controller shaft each connected with a numeral key and provided with a depending arm having a pin at its lower end, a series of arms fast on the controller shaft one in the path of each depending arm, a series of pivoted locking dogs each arranged to be operated by one of the arms fast on the controller shaft and each provided with a tooth and means operated by the arms fast on the controller shaft for moving the locking dog so that its tooth will be in the path of the pin on a depending arm.

33. In a calculating machine for use with a typewriting machine having numeral keys, the combination with a numeral key of a controlling shaft, a full stroke mechanism for locking the controller shaft against return until it has completed its full movement, an arm mounted to swing on the controller shaft and connected with the numeral key and provided with a depending arm having a pin at its lower end, an arm fast on the controller shaft in the path of the depending arm, and a bell crank lever having a tooth adapted to engage the pin on the depending arm, and means operated by the movement of the arm fast on the controller shaft for swinging the bell crank lever to engage the pin on the depending arm and prevent its return movement.

34. In a calculating machine for use with a typewriting machine having numeral keys, the combination with a numeral key of a controller shaft, a full stroke mechanism for locking the controller shaft against return until it has completed its full movement, an arm mounted to swing on the controller shaft and connected with the numeral key, and provided with a depending arm having a pin at its lower end, an arm fast on the controller shaft in the path of the depending arm, and a bell crank lever having a tooth adapted to engage the pin on the depending arm, and means operated by the movement of the arm fast on the controller shaft for swinging the bell crank lever to engage the pin on the depending arm and prevent its return movement, and means carried by the arm fast on the controller shaft for swinging the bell crank lever into position to release the depending arm on the completion of a full stroke.

35. In a calculating machine for use with a typewriting machine having numeral keys, the combination with a numeral key of a controller shaft, a full stroke mechanism for locking the controller shaft against return until it has completed its full movement, an arm mounted to swing on the controller shaft and connected with the numeral key and provided with a depending arm having a pin at its lower end, an arm fast on the controller shaft in the path of the depending arm, a locking dog having a fixed pivot and provided with a tooth arranged to be projected into the path of the pin on the depending arm, a bell crank lever pivoted to the arm fast on the controller shaft having a tooth arranged to be projected into the path of the pin on the depending arm, and means carried by the arm fast on the controller shaft for operating the locking dog and bell crank lever.

36. In a calculating machine for use with a typewriting machine having numeral keys, the combination with a numeral key of a controller shaft, an arm mounted to swing on the controller shaft, an actuating rod connecting the arm with the key, a depending arm on the swinging arm having a pin at its end, an arm fast on the controller shaft in the path of movement of the downwardly extending arm, a bell crank lever pivoted on the arm fast on the controller shaft, a pin on said arm limiting the swing of the bell crank lever, a tooth on the forwardly extending arm of the bell crank lever, a locking dog pivoted on a fixed pivot, means operated by the arm fast on the controller shaft for swinging the locking dog and means carried by the locking dog to cause the tooth of the bell crank lever arm to be projected into and withdrawn from the path of movement of the pin on the depending arm.

37. In a calculating machine for use with a typewriting machine having numeral keys, the combination with the numeral keys, a controller shaft, a series of arms one for each numeral key mounted to swing on the controller shaft each connected with a numeral key and provided with a depending arm having a pin at its lower end, a series of arms fast on the controller shaft one in the path of each depending arm, a series of pivoted locking dogs each pivoted on a fixed pivot, and having a cam shaped upper edge with a projecting finger at the rear of its upper edge and having a projecting tooth on its lower edge adapted to extend into the path of movement of the pin on the depending arm, and a pin on the arm fast on the controller shaft arranged to act against the upper edge of the locking dog to first cause its tooth to extend into the path of the pin on the depending arm and by its final movement to withdraw the tooth.

38. In a calculating machine for use with a typewriting machine having numeral keys, the combination of a controller shaft, arms mounted to swing on the controller shaft, a differential shaft parallel with the controller shaft provided with differential arms one in the path of each of the swinging arms on the controller shaft, arms fast on the controller shaft one in the path of each of the swinging arms, a main shaft provided with two ratchet wheels fast on the shaft having teeth pointing in opposite directions, a gear carrying a pawl engaging the teeth of one of the ratchet wheels to rotate the main shaft in one direction, a detent pawl engaging the teeth of such ratchet wheel to prevent rotation in the other direction, a segment on the differential shaft in mesh with the gear, index wheels arranged to be rotated by gearing driven by the main shaft, a sleeve mounted to rotate on the main shaft carrying a pawl arranged to pass over the teeth of the second ratchet wheel without engaging them when the sleeve is rotated in one direction and to be engaged by the teeth of the ratchet wheel to prevent return movement and a segment gear carried by the controller shaft for driving the sleeve.

39. In a calculating machine for use with a typewriting machine having numeral keys, the combination of a controller shaft, arms mounted to swing on the controller shaft, a differential shaft parallel with the controller shaft provided with differential arms one in the path of each of the swinging arms on the controller shaft, arms fast on the controller shaft one in the path of each of the swinging arms, a main shaft provided with two ratchet wheels fast on the shaft having teeth pointing in opposite direction, a gear carrying a pawl engaging the teeth of one of the ratchet wheels to rotate the main shaft in one direction, a detent pawl engaging the teeth of such ratchet wheel to prevent rotation in the other direction, a segment on the differential gear in mesh with the gear, index wheels arranged to be rotated by gearing driven by the main shaft, a sleeve mounted to rotate on the main shaft carrying a pawl arranged to pass over the teeth of the second ratchet wheel without engaging them when the sleeve is rotated in one direction and to be engaged by the teeth of the ratchet wheel to prevent return movement, a segment gear carried by the controller shaft for driving the sleeve and means for disengaging the pawl from the teeth of the ratchet wheel on the completion of a full movement of the controller shaft.

40. In a calculating machine for use with a typewriting machine having numeral keys, the combination with a controller shaft, arms one for each numeral key mounted to swing on the controller shaft, a differential shaft parallel with the controller shaft provided with differential arms one in the path of each of the swinging arms on the controller shaft, arms fast on the controller shaft one in the path of each swinging arm, a main shaft provided with a gear loose thereon carrying a pawl, a ratchet wheel fast on the shaft arranged to be engaged and driven by the pawl, a series of index wheels, gearing between the shaft and index wheels for rotating them, a segment gear on the differential shaft arranged to mesh with the gear carrying the pawl, a sleeve mounted to rotate on the main shaft and carrying a pawl, a segment gear carried by the controller shaft in mesh with the sleeve, and a second ratchet wheel arranged to be engaged by the pawl carried by the sleeve to prevent return movement of the controller shaft.

41. In a calculating machine for use with a typewriting machine having a paper carriage and numeral keys, a series of index wheels, means operated by the numeral keys for rotating the index wheels comprising a sliding gear and a slide for shifting it, a pin carried by the paper carriage, a lever for shifting the slide connected at one end with the slide and having its other end adapted to be engaged by the pin and a fixed guide for holding the pin in engagement with the end of the lever during its movement.

42. In a calculating machine for use with a typewriting machine having a paper carriage and numeral keys, a series of index wheels, means operated by the numeral keys for rotating the index wheels comprising a sliding gear and a slide for shifting it, a pin carried by the paper carriage but free to move vertically, a lever for shifting the slide connected at its lower end with the slide and having an open notch in its upper end in the path of movement of the pin and a fixed guide adapted to guide the pin into the notch and to hold it there during the movement of the slide.

43. In a calculating machine for use with a typewriting machine having a paper carriage and numeral keys, a series of index wheels, means operated by the numeral keys for rotating the index wheels comprising a sliding gear and a slide for shifting it, a pin carried by the paper carriage but free to move vertically, a lever for shifting the slide connected at its lower end with the slide and having an open notch in its upper end in the path of movement of the pin and a fixed guide open at both ends in the path of the pin adapted to guide the pin into the notch on both the forward and return movement of the paper carriage and to hold it in the notch until the slide has completed its forward or return movement.

44. In a calculating machine for use with a typewriting machine having a paper carriage and numeral keys, a series of index wheels means operated by the numeral keys for rotating the index wheels comprising a sliding gear, and a slide for shifting a notched bar carried by the paper carriage, a sleeve adjustable on the notched bar a rod pivoted to the sleeve having a pin at its free end and having an extension in the opposite direction beyond its pivot, a pin on the sleeve in the path of movement of the end of the extension, a lever connected at one end to the slide and having its other end in the path of the pin on the end of the pivoted rod.

45. In a calculating machine the combination of a main shaft, means for operating it in one direction only, a sleeve splined on the shaft carrying oppositely arranged gear wheels, a counter shaft provided with a pinion arranged between the oppositely arranged gear wheels, index wheels and means driven by the counter shaft for rotating the index wheels, means for shifting the sleeve to cause one or the other of the oppositely arranged gear wheels to mesh with the pinion and means for locking the pinion against rotation during the shifting movement.

46. In a calculating machine the combination of a main shaft, means for operating it in one direction only, a sleeve splined on the shaft carrying oppositely arranged gear wheels with a pinion arranged between the oppositely arranged gear wheels, index wheels and means driven by the counter shaft for rotating the index wheels, means for shifting the sleeve to cause one or the other of the oppositely arranged gear wheels to mesh with the pinion comprising a rod carrying a cam between the oppositely arranged gear wheels and means operated by the rod for locking the pinion against rotation during the shifting of the sleeve.

47. In a calculating machine the combination of a main shaft, means for operating it in one direction only, a sleeve splined on the shaft carrying oppositely arranged gear wheels a counter shaft provided with a pinion arranged between the oppositely arranged gear wheels, index wheels and means driven by the counter shaft for rotating the index wheels, means for shifting the sleeve to cause one or the other of the oppositely arranged gear wheels to mesh with the pinion comprising a rod carrying a cam between the oppositely arranged gear wheels and means operated by the rod for locking the pinion against rotation during the shifting of the sleeve, comprising a rock shaft carrying a locking dog arranged to be swung into engagement with the teeth of the pinion.

48. In a calculating machine for use with a typewriting machine having numeral keys, a controller shaft arranged to be rocked by the numeral keys, interlocking means for preventing the depression of more than one numeral key at a time arranged to be released by rocking the controller shaft through a full movement and means independent of the numeral keys for rocking the controller shaft to its full movement to release the interlocking means and permit the numeral keys to be depressed without causing the operation of the controller shaft.

49. In a calculating machine for use with a typewriting machine having numeral keys, a controller shaft arranged to be rocked by the numeral keys, interlocking means for preventing the depression of more than one numeral key at a time arranged to be released by rocking the controller shaft through a full movement and means independent of the numeral keys for rocking the controller shaft to its full movement to release the interlocking means and permit the numeral keys to be depressed without causing the operation of the controller shaft comprising a forwardly extending arm on the controller shaft, a differential shaft having an arm thereon coöperating with the arm on the controller shaft and means for rocking the differential shaft.

50. In a calculating machine for use with a typewriting machine having numeral keys, a controller shaft arranged to be rocked by the numeral keys, interlocking means for preventing the depression of more than one numeral key at a time arranged to be released by rocking the controller shaft through a full movement and means independent of the numeral keys for rocking the controller shaft to its full movement to release the interlocking means and permit the numeral keys to be depressed without causing the operation of the controller shaft, comprising a forwardly extending arm on the controller shaft, a differential shaft having an arm thereon coöperating with the arm on the controller shaft, a bell crank lever pivoted in line with the controller shaft a rearwardly extending arm on the differential shaft and the horizontal member of the bell crank lever, and means for locking the bell crank lever in its forward and rear positions.

51. In a calculating machine for use with a typewriting machine having numeral keys of a controller shaft, a series of arms one for each numeral key mounted to swing on the controller shaft and each operatively connected with a numeral key and each provided with a downwardly extending arm, a series of arms fast on the controller shaft each normally in the path of the extension on one of the swinging arms interlocking means operated by the arms fast on the controller shaft to prevent depression of all of the keys except the one being depressed, adapted to be released by the full movement of such arms, and means independent of the numeral keys for rocking the controller shaft to swing the arms fast on the shaft into position to release the interlocking means and to lock the controller shaft in such position.

This specification signed and witnessed this 13th day of June, A. D. 1912.

HIESTER A. BOWERS.

In the presence of—
PARKER COOK,
JOHN COOK.